(12) United States Patent
Khairallah et al.

(10) Patent No.: US 7,021,393 B2
(45) Date of Patent: Apr. 4, 2006

(54) LANDSCAPE TILLER

(75) Inventors: Gabriel G. Khairallah, Carrboro, NC (US); Michael A. Pepe, Chapel Hill, NC (US); James B. Normann, Holly Springs, NC (US)

(73) Assignee: Caterpillar Inc., Peoria, IL (US)

( * ) Notice: Subject to any disclaimer, the term of this patent is extended or adjusted under 35 U.S.C. 154(b) by 146 days.

(21) Appl. No.: 10/729,127

(22) Filed: Dec. 5, 2003

(65) Prior Publication Data
US 2005/0121208 A1    Jun. 9, 2005

(51) Int. Cl.
*A01B 33/00* (2006.01)
*A01B 79/00* (2006.01)

(52) U.S. Cl. .............................. 172/1; 172/42; 172/123; 172/125

(58) Field of Classification Search ..................... 172/1, 172/41, 42, 90, 118, 121–125; 299/39.1–41.1, 299/73–78, 10; 173/190–196, 44
See application file for complete search history.

(56) References Cited

U.S. PATENT DOCUMENTS

| | | | |
|---|---|---|---|
| 4,761,038 | A | 8/1988 | Hackmack |
| 4,878,713 | A | 11/1989 | Zanetis |
| 6,467,550 | B1 | 10/2002 | Firdaus |
| 6,497,294 | B1 | 12/2002 | Vought |

*Primary Examiner*—Christopher J. Novosad

(57) ABSTRACT

An implement and method of assembly, wherein the implement comprises a housing having a first-side portion and a second-side portion, at least one element having a weight, the element being attached to the second-side portion of the housing and the weight of the element creating a moment arm, a shaft positioned between the first-side portion and second-side portion of the housing and operably coupled to at least one of the element, and a counterweight attached to the first-side portion of the housing, the counterweight offsetting the moment arm created by the weight of the element.

20 Claims, 3 Drawing Sheets

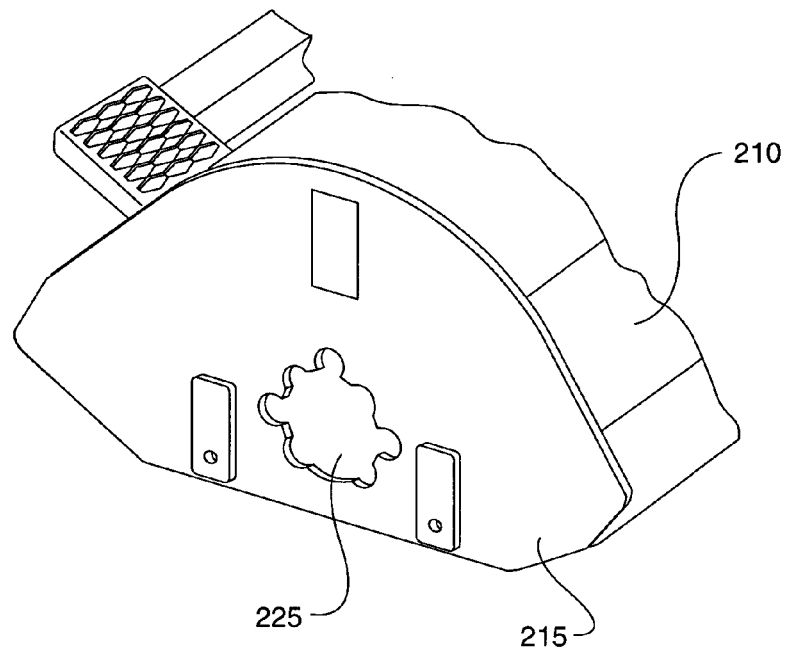
Fig_2a_
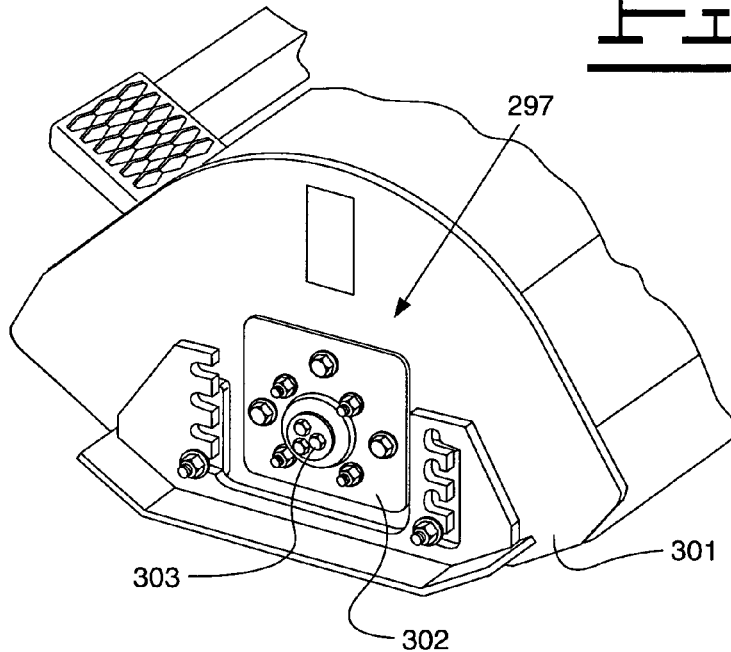
Fig_3_

LANDSCAPE TILLER

TECHNICAL FIELD

This invention relates generally to an implement of a work machine, and, more particularly, to a landscape tiller of a work machine having a single direct drive motor.

BACKGROUND

Work machines, such as skid steer loaders, tractors, wheel loaders, or backhoe loaders, or other similar work machines use implements, such as landscape tillers, to cultivate the ground, till the ground, level the ground, or other additional operations. When used to perform these sorts of operations, it is normally helpful to have the landscape tiller balanced. Most landscape tillers use two motors, each being positioned on one end of the tiller to offset the weight of each motor and help balance the tiller. Having two motors increases the cost of the tiller and the potential for malfunction. The use of a single motor large enough to drive the landscape tiller, however, can cause the landscape tiller to be off balance.

One known tiller assembly design is disclosed in U.S. Pat. No. 6,467,550 B1 that issued to Firdaus on Oct. 22, 2002. It discloses a tiller assembly including a tine assembly that is rotatably connected to a tiller body. The tiller assembly includes a hydraulic system that is operatively connected to a hydraulic motor that drives the tine assembly. This design has only one hydraulic motor to drive the tine assembly, but due to the weight of the hydraulic motor, the tiller may become off balance and may not till level.

The present disclosure is directed to overcoming one or more of the problems as set forth above.

SUMMARY OF THE INVENTION

One embodiment disclosed herein is an implement comprising a housing having a first-side portion and a second-side portion, at least one element having a weight and being attached to the second-side portion of the housing, the weight of the element creating a moment arm, a shaft positioned between the first-side portion and second-side portion of the housing and operably coupled to at least one of the element, and a counterweight attached to the first-side portion of the housing to offset the moment arm created by the weight of the element.

In another embodiment disclosed herein, a method comprises fabricating a housing having a first-side portion and a second-side portion, attaching a motor to the second-side portion of the housing, positioning a shaft between the first-side portion and the second-side portion of the housing and connecting it thereto, operably coupling the motor to the shaft, and attaching a counterweight to the first-side portion of the housing to offset the moment arm created by the weight of the motor.

BRIEF DESCRIPTION OF THE DRAWINGS

For a better understanding of the present disclosure, reference may be made to the accompanying drawings in which:

FIG. 2a is a diagrammatic view of a side portion of the landscape tiller; and

FIG. 3 is a diagrammatic side view of the side portion of the landscape tiller.

DETAILED DESCRIPTION

Figure 1:
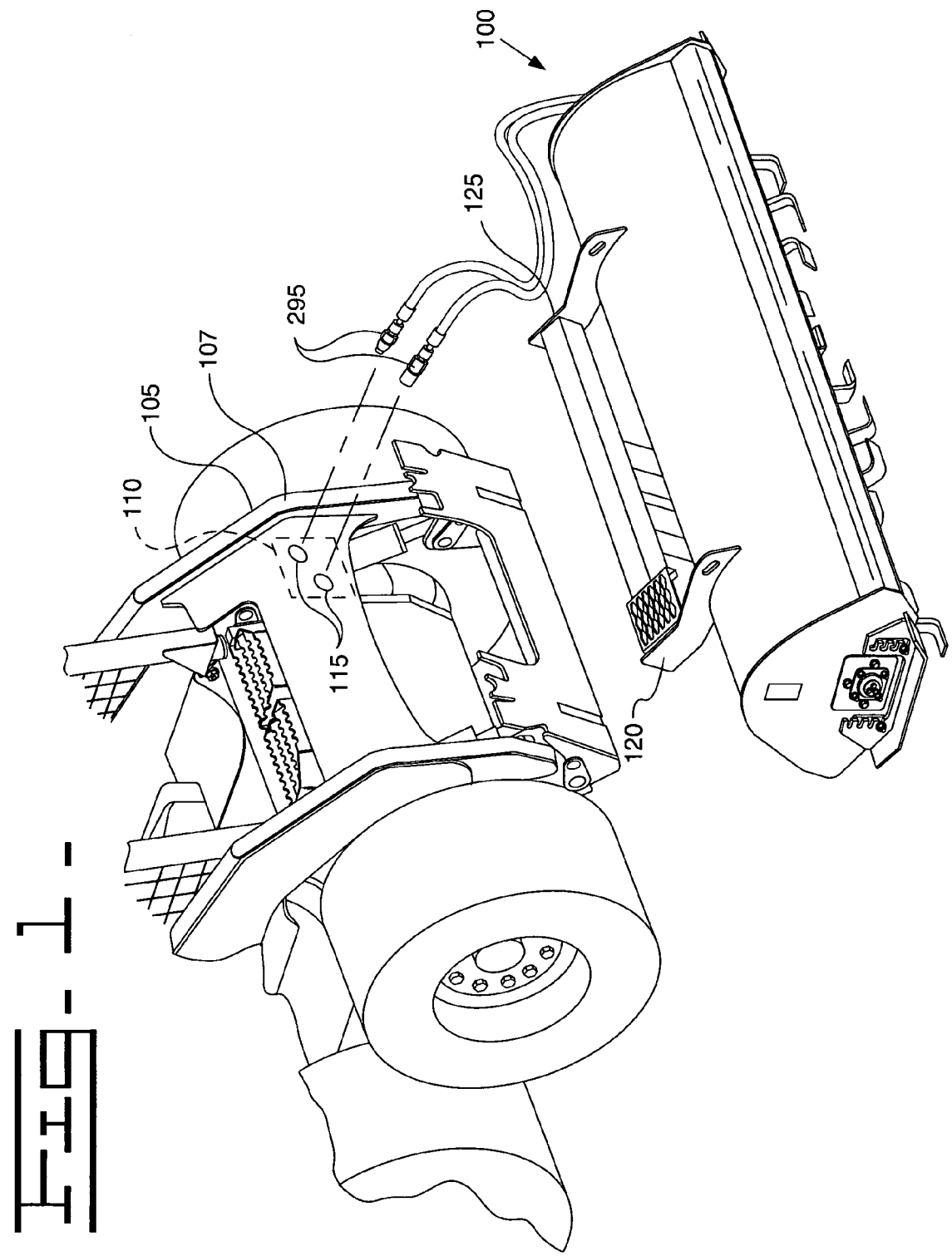
FIG. 1 is a diagrammatic front and side view of a landscape tiller operatively mounted to a skid steer loader.

Referring to the drawings, depicted in FIG. 1 is an implement, such as a landscape tiller 100, operatively mounted in the conventional manner to a body portion 107 of a work machine 105, such as, but not limited to, a skid steer loader, tractor, wheel loader, or backhoe loader. The work machine 105 includes a hydraulic system 110 including a source of pressurized fluid. The hydraulic system 110 includes a pair of hydraulic fittings 115 adapted to attach, in fluid communication, the landscape tiller 100 with the hydraulic system 110. First and second level indicators 120, 125 are attached at opposite ends of the landscape tiller 100 so that the operator can visually determine the orientation of the landscape tiller 100.

Figure 2:
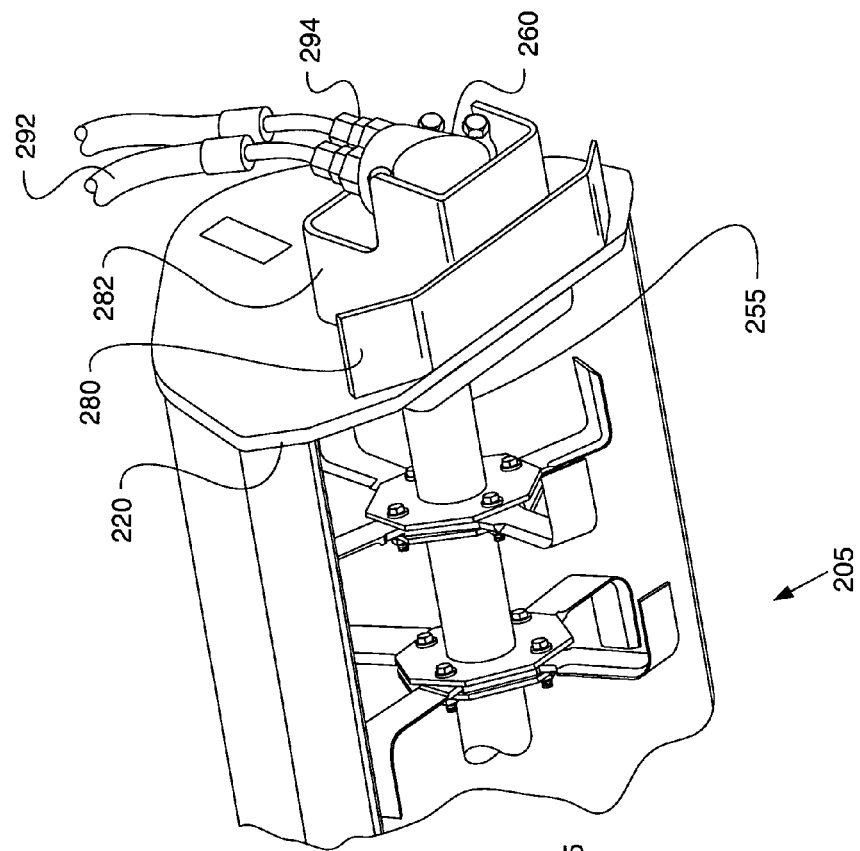
FIG. 2 is a diagrammatic view of the underside of the landscape tiller.
Figure 2:
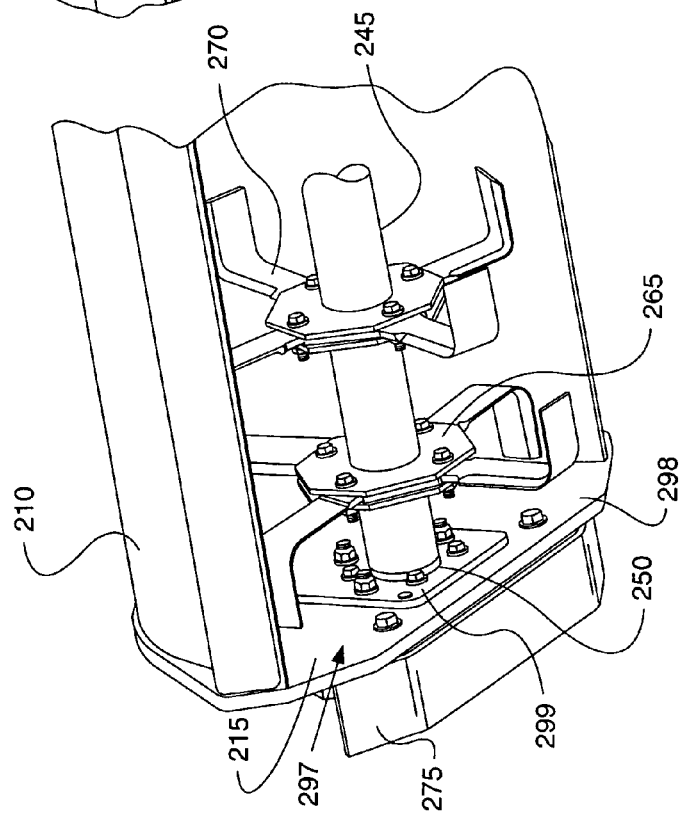

As depicted in FIG. 2, with reference numbers of previous figures being used to identify similar components therein, the landscape tiller 100 includes a tiller mechanism 205 partially enclosed in a housing 210 having a first-side portion 215 and a second-side portion 220. As depicted in FIG. 2a, the housing 210 includes a first aperture 225 in the first-side portion 215 and a second aperture (not shown) in the second-side portion 220.

As further depicted in FIG. 2, the tiller mechanism 205 includes a shaft 245, having a first end 250 and a second end 255. The first end 250 is adjustably and rotatably attached to the first-side portion 215 of the housing 210. The second end 255 is operably attached to a motor 260 (as more specifically described below), which may be a hydraulic motor, a gerotor type motor, an electric motor, a gasoline motor, or other types of motors. The tiller mechanism 205 further includes a plurality of plates 265 attached to the shaft 245 by welding or another suitable process. Removably attached to each plate 265 is a plurality of teeth 270.

As depicted in FIG. 2, the second-side portion 220 of the housing 210 has at least one element attached thereto such that the second-side portion 220 of the housing 210 is heavier than the first-side portion 215 of the housing 210 when nothing is attached thereto, and because of the weight of the at least one element, a moment arm is created. In this embodiment, the element includes the motor 260, but alternatively, may include an additional motor, at least one pump, at least one controller, etc. The housing 201, further, has a first skid 275 and second skid 280 attached thereto, by bolting or another suitable process, to the first-side portion 215 and second-side portion 220, respectively. The first and second skids 275, 280 contact the ground when the landscape tiller 100 is in an operable condition. Mounted above the second skid 280 on the second-side portion 220 of the housing 210 is a motor mount 282. The motor mount 282 is attached by bolting it thereto, or another suitable process. The motor 260 is attached to the motor mount 282 in a conventional manner at the second-side portion 220. The motor 260 includes a splined coupling (not shown) that extends through the second aperture in the second-side portion 220 of the housing 210 and is rotatably attached to the shaft 245 in a conventional manner. A motor-shaft seal (not shown) is attached to the motor 260 so as to protect it against debris entering therein. Additionally, a shaft seal (not shown) located adjacent the motor-shaft seal is attached at the attachment location of the splined coupling of the motor 260 and the shaft 245. Finally, first-end portions 294 of a pair of hydraulic hoses 292 are connected with the motor 260 and second-end portions 295 of the hydraulic hoses 292 are connected with the hydraulic fittings 115 of the hydraulic system 110, as depicted in FIG. 1. When the hydraulic hoses 292 are connected with the motor 260 of the landscape tiller 260 and the hydraulic fittings 115 of the work machine 105, the motor 260 is in fluid communication with the hydraulic system 110.

As depicted in FIGS. 2 and 3, with reference numbers of previous figures being used to identify similar components therein, a counterweight 297 is located at the first-side portion 215 of the housing 210 to offset the moment arm created by the weight at the second-side portion 220 of the housing 210, including the weight of the motor 260. The counterweight 297, in this embodiment, is attached to the first-side portion 215 of the housing 210, but may also be formed integrally with the housing 210. The counterweight 297, of this embodiment, includes a first plate 302 and a second plate 299, each plate having an aperture (not shown). The first plate 302 is placed on an outside 301 of the first-side portion 215 of the housing 210 covering the first aperture 225 and the second plate 299 is placed on an inside 298 of the first-side portion 215 of the housing 210 covering the first aperture 225. The first and second plates 302, 299 are bolted together in compressive engagement with the first-side portion 215 of the housing 210; the compressive forces holding the first and second plates 302, 299 in place.

Finally, the shaft 245 is adjustably and rotatably attached to the first and second plates 302, 299 by extending the first end 250 of the shaft 245 through the apertures in the first and second plates 302, 299 creating a sealed rotatable attachment thereto. Then a plurality of floating bearings 303 are attached to the first end 250 of the shaft 245 and attached to the first plate 302, further rotatably attaching the first end 250 of the shaft 245 to the first and second plates 302, 299. Adjusting the location of the attachment of the counterweight 297 to the first-side portion 215 of the housing 210 permits the shaft 245 to align with the motor 260. In particular, the shape of the first aperture 225 in the housing 210 permits the first and second plates 302, 299 to be adjusted by moving the first and second plates 302, 299 within the first aperture 225 until the floating bearings 303 align with the shaft 245 and the shaft 245 aligns with the motor 260.

INDUSTRIAL APPLICABILITY

Normally, the operator will activate the landscape tiller 100 in a conventional manner so that pressurized fluid is sent from the hydraulic system 110 through the hydraulic hoses 292 to the motor 260. The pressurized fluid activates the motor 260 and the motor 260 rotates the shaft 245. The shaft 245 may rotate in either a clockwise or a counter-clockwise direction as selected by the operator.

The landscape tiller 100 normally needs to be substantially balanced. In the present embodiment, this is accomplished by having the counterweight 297 on the second-side portion 220 of the housing 210 being of substantially the same weight as that of the motor 260 so as to offset the moment arm created by the weight of the motor 260. Additionally, the housing 210 may be formed with the counterweight 297 integral with the first-side portion 215 thereof so as to offset the moment arm created by the weight of the motor 260. Finally, the counterweight 297 may also offset the moment arm created by not only the weight of the motor 260 but the weight of any other element that may be attached to the second-side portion 220 of the housing 210, such as an additional motor, at least one pump, at least one controller, etc., where the weight of the counterweight 297 is substantially similar to the weight of all of the elements attached to the second-side portion 220 of the housing 210. This will permit the landscape tiller 100 to operate in a relatively balanced position.

Other aspects, objects and advantages of the invention could be obtained from a study of the drawings, the disclosure and the appended claims.

What is claimed is:

1. An implement, comprising:
    a housing having a first-side portion and a second-side portion;
    at least one driving element having a weight, the driving element being attached to the second-side portion of the housing and the weight of the driving element creating a moment arm;
    a shaft positioned between the first-side portion and second-side portion of the housing and operably coupled to the at least one driving element; and
    a non-driving counterweight attached to the first-side portion of the housing, the non-driving counterweight offsetting the moment arm created by the weight of the driving element.

2. The implement of claim 1, wherein the implement comprises a landscape tiller.

3. The implement of claim 1, wherein the driving element is a motor.

4. The implement of claim 3, wherein the non-driving counterweight has a weight substantially equal to the weight of the motor.

5. The implement of claim 3, wherein the motor is a hydraulic motor.

6. The implement of claim 1, wherein the non-driving counterweight comprises a first plate and a second plate, the first and second plates attaching the shaft to the first-side portion of the housing.

7. The implement of claim 6, wherein the first plate is adjustably attached to an outer side of the first-side portion of the housing and the second plates is adjustably attached to an inner side of the first-side portion of the housing.

8. The implement of claim 7, wherein the adjustability of the first and second plates parallel to the first-side portion of the housing permits the shaft to align with the motor.

9. A method, comprising:
    fabricating a housing having a first-side portion and a second-side portion;
    attaching a motor, having a weight, to the second-side portion of the housing, wherein the motor being attached to the second-side portion of the housing creates a moment arm;
    positioning a shaft between the first-side portion and the second-side portion of the housing and connecting the shaft thereto;
    operably coupling the motor to the shaft; and
    attaching a non-driving counterweight to the first-side portion of the housing, the non-driving counterweight offsetting the moment arm created by the motor.

10. The method of claim 9, wherein the non-driving counterweight has a weight substantially equal to the weight of the motor.

11. The method of claim 9, further comprising:
    attaching the shaft to the non-driving counterweight; and
    aligning the shaft with the motor by adjusting a location of the attachment of the non-driving counterweight parallel to the first-side portion of the housing.

12. The method of claim 9, wherein attaching the non-driving counterweight further comprises attaching a first plate to an outside of the first-side portion of the housing and attaching a second plate to an inside of the first-side portion of the housing.

13. The method of claim 9, wherein the implement comprises a landscape tiller.

14. A work machine, comprising:
a body portion; and
an implement operatively mounted to the body portion, the implement including:
a housing having a first-side portion and a second-side portion;
a motor attached to the second-side portion of the housing;
a shaft positioned between the first-side portion and the second-side portion and operably coupled to the motor; and
a non-driving counterweight attached to the first-side portion of the housing, the non-driving counterweight having a weight substantially equal to that of the motor.

15. The work machine of claim 14, wherein the implement comprises a landscape tiller.

16. The work machine of claim 14, wherein the motor is a hydraulic motor.

17. The work machine of claim 14, wherein the non-driving counterweight comprises a first plate and a second plate, the first and second plates attaching the shaft to the housing.

18. The work machine of claim 17, wherein the first and second plates are adjustably attached to the first-side portion of the housing.

19. The work machine of claim 18, wherein the adjustability of the first and second plates permits the shaft to align with the motor.

20. The work machine of claim 19, wherein the adjustability of the first and second plates parallel to the first-side portion of the housing permits the shaft to align with the motor.

* * * * *

UNITED STATES PATENT AND TRADEMARK OFFICE
CERTIFICATE OF CORRECTION

| | | |
|---|---|---|
| PATENT NO. | : 7,021,393 B2 | |
| APPLICATION NO. | : 10/729127 | |
| DATED | : April 4, 2006 | |
| INVENTOR(S) | : Gabriel G. Khairallah et al. | |

It is certified that error appears in the above-identified patent and that said Letters Patent is hereby corrected as shown below:

Please make the following corrections to the cover sheet of patent as follows:

Assignee: delete "Caterpillar Inc., Peoria, IL (US)" and insert -- Caterpillar S.A.R.L., Geneva, Switzerland--

Signed and Sealed this

Twenty-sixth Day of June, 2007

JON W. DUDAS
*Director of the United States Patent and Trademark Office*